M. F. UNGERER.
PROCESS FOR OBTAINING PHOTOGRAPHIC PRINTS IN NATURAL COLORS FROM LUMIÈRE, AUTOCHROME, AND OTHER COLOR SENSITIVE LINED PLATES.
APPLICATION FILED AUG. 15, 1913.

1,128,389. Patented Feb. 16, 1915.

WITNESSES:
John C. Sanders
Albert F. Heuman

INVENTOR:
Max Friedrich Ungerer
BY Wallace White
ATTY.

UNITED STATES PATENT OFFICE.

MAX FRIEDRICH UNGERER, OF OFFENBACH-ON-THE-MAIN, GERMANY.

PROCESS FOR OBTAINING PHOTOGRAPHIC PRINTS IN NATURAL COLORS FROM LUMIÈRE, AUTOCHROME, AND OTHER COLOR-SENSITIVE LINED PLATES.

1,128,389.      Specification of Letters Patent.      Patented Feb. 16, 1915.

Application filed August 15, 1913. Serial No. 784,847.

*To all whom it may concern:*

Be it known that I, MAX FRIEDRICH UNGERER, chemist, a subject of the German Emperor, residing at 1 Rödernstrasse, Offenbach-on-the-Main, Germany, have invented new and useful Improvements in Processes for Obtaining Photographic Prints in Natural Colors from Lumière, Autochrome, and other Color-Sensitive Lined Plates, of which the following is a specification.

In the art of color photography it has already been proposed to print from three part negatives separately and subsequently to form into one picture the three separate partial pictures so obtained, which pictures consist either of pigment sheets or of colored gelatin films; but this operation is difficult and takes up a great deal of time, while frequently the result is entire failure. It is, however, so far as I am aware, quite new to obtain the three part negatives direct from color-sensitive lined plates in the manner hereinafter described, and to copy them one after the other on one and the same surface, thus getting three separate colored part pictures one above the other on the same surface, the finished picture giving the colors of the original.

Under the present invention the process consists essentially in making three part negatives from Lumière, autochrome or similar color sensitive lined plates which are diapositive in the proper sense of the word, the usual three subtractive color filters being employed, the copying being done by contact on panchromatic plates. The three part negatives so obtained are extremely delicate and full in detail, and if printed from on paper or other suitable material hereinafter described prints will be obtained that reproduce exactly the colors of the original. The literature of the subject contains nothing about such process. For the preparation of three color photographs, three separate part negatives, made in cameras and the like, are spoken of in all cases. So far as is known, it is new to prepare those three part negatives from color sensitive lined plates in the way described, whereby it becomes possible to reproduce the original in the most delicate half tones and perfectly true in the colors, because the part pictures can be accommodated very easily to the negatives that are to be copied.

Figure 1:
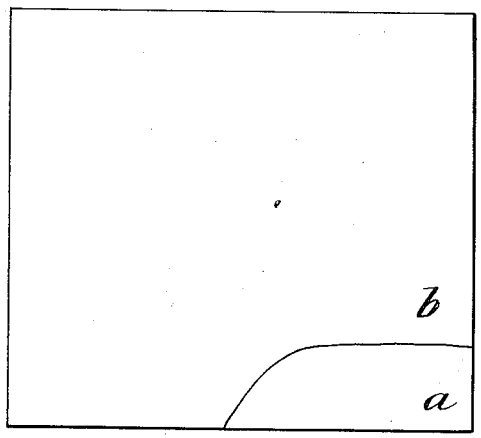
Figure 3:
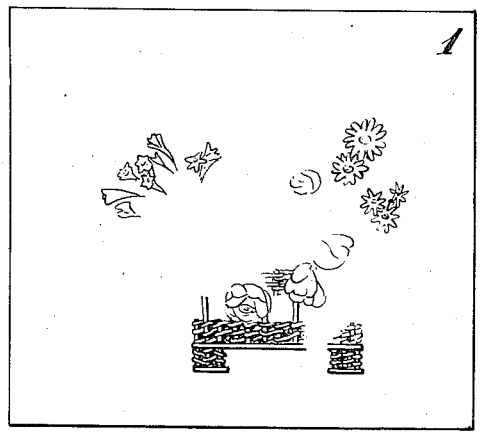
Figure 2:
Figure 4:
Figure 5:
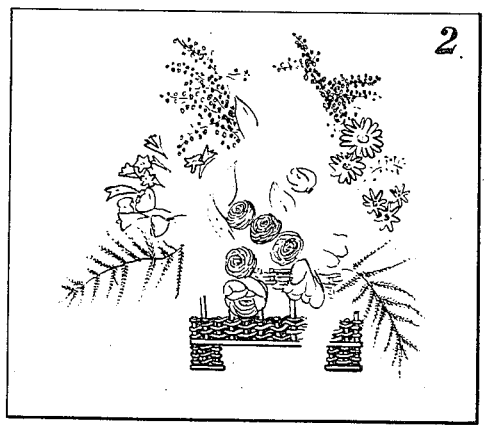
Figure 6:
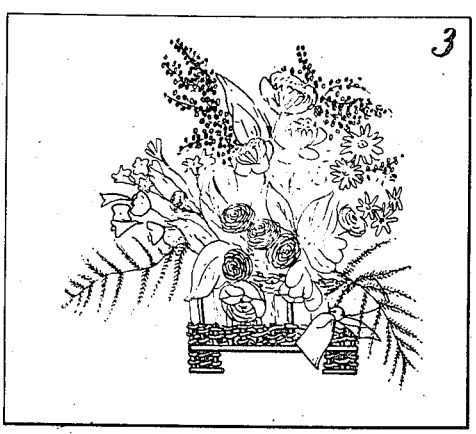

The invention is illustrated in the accompanying drawings, in which:

Figure 1 is a plan view of a sheet of paper having the base layer associated therewith for the blue print, the base layer being broken away; Fig. 2 is a sectional view of Fig. 1; Fig. 3 is a plan view of the first partial picture (blue print); Fig. 4 is a sectional view of Fig. 3; Fig. 5 is a view of the combined first and second partial picture (blue and red print); and Fig. 6 is a view of the whole picture (blue, red and yellow print).

In the drawing, $a$ represents a sheet of paper bearing the basic layer, $b$, to which latter is applied the readily sensitive layer of fish glue, $c$.

$d$ represents the layer of collodion which is applied to layer $c$ subsequent to the drying of the copied and developed partial picture.

The process is carried out as follows: For paper the best thing to use is an unsensitized baryta gelatin paper of any desired thickness—such as is generally used in making the ordinary silver bromid papers. Sized drawing paper is not found to be so suitable as it does not give nearly such fine clean half tones with the deepest blue and does not give quite pure whites. In the first place the back of the paper is coated or painted with a solution of 3% gelatin to which a small quantity of chrome alum has been added, so as to make sure that it will stretch only to the smallest possible extent. After being dried, the paper is laid in a tray or saucer with cold water and kept there for about one minute until the gelatin layer is thoroughly softened. The paper is then laid on a piece of plate glass or such like and pressed lightly with a roller on the coated side for the purpose of removing any superfluous water. The wet sheets are then laid on a drawing board or flat surface which has been covered with paper and are fixed at the four corners. The sheets have now to be coated or painted with the sensitizing solution which may be one of the generally known mixtures such as used for the ferroprussiate or blue process. Every soft full paint brush may be used and it is preferably manipulated lengthwise and cross wise over the moist gelatin layer.

The sensitizing solution may consist of:

1. 50 cubic cm. distilled water; 4.5 grams potassium ferricyanid. 2. 50 cubic cm. distilled water; 12.5 grams ammonium ferric citrate (green). Of these solutions equal parts are taken and mixed together. About 25 cubic cm. will suffice for four sheets of paper 18 by 24 cm. large. The sheets after coating are dried as quickly as possible and then printed under the red filter negative until the darkest shadows appear a bright gray-blue. The print is then washed and dried. If the color is not intense enough, the print can be dipped for a moment or two into a solution of ½% ferric chlorid. The thoroughly dried prints are then laid for about 8-10 minutes in a tray with zapon-lac or other suitable substance, to render them perfectly impenetratable to water, and they are then dried again. Meanwhile two solutions are prepared for the subsequent coating of the prints. One solution consists of 68 grams of American fish glue, such as is used in chemico-graphic laboratories which is dissolved in 100 grams water while the other solution consists of 6 grams of dry egg albumen which is dissolved in 75 grams of water also and after the albumen is properly dissolved 8 grams of ammonium bichromate are added. The two solutions are then mixed and finally 7.5 cubic cm. of a 10% solution of chromic acid are added, and the whole is filtered repeatedly. This forms a stock solution which will keep for about fourteen days. A small quantity of the stock solution, about 100 cubic cm. is then taken and diluted with 50 cubic cm. of water, to form a solution for immediate use. The prints are meanwhile secured to a small hand centrifugal apparatus and repeatedly washed with the last mentioned solution and then dried by means of the centrifugal apparatus over a small gas flame or spirit flame. The coating obtained in this way is very thin and uniform, and when properly dry the subsequent operations can be proceeded with at once. The paper after coating, as above described, is sensitive to light and should be handled in the dark room with a suitable light. The blue filter negative is then taken, on which the blue print can be very easily fitted exactly, and exposed to bright sunlight or other suitable actinic light for a short time. If an electric copying lamp is used the time for exposure should be about three minutes. The print is then laid for about a quarter of an hour in cold water, and thereafter placed in a tray containing the following yellow solution:—2 grams aurophenin (such as can be obtained from the Farbwerke Höchst-on-the-Main) dissolved in 100 cubic cm. hot distilled water. This solution is then made up to 1 liter with distilled water and 200 cubic cm. alcohol, 96% are added. The print is placed in this solution, being kept in constant movement, and allowed to remain—being frequently examined and rinsed—until the yellow of the print has acquired the right shade and the green too partly appears in the right shade. The print is then washed and well dried and 2% collodion poured over same. After the layer of collodion has dried, a second coating of the fish glue solution, above described, is given to the print, then it is placed under the green filter negative, exposed, washed and laid in the red bath, which consists of:— 10-12 cubic cm. of a 3% solution of erythrosin (which can be obtained from the Farbwerke Höchst-on-the-Main) dissolved in 100 cubic cm. water. After sufficient saturation, when the red color of the picture has appeared correctly the print is slightly washed and then put into a 5% solution of cupric sulfate for about two minutes, washed again and dried. The picture is then complete. It should be observed that the tinting with the coloring material is completed in a few minutes in each instance while the tinting of separate gelatin films such as has heretofore been done occupies from one to ten hours.

I claim:

The herein-described process for obtaining protographic prints in natural colors, which consists in making three-part negatives from lined plates by employing subtractive color filters, printing from one of said negatives upon a surface coated with a solution used for the blue-printing process, applying a waterproof coating, applying a transparent sensitized coating, printing thereon from another of said negatives which is in registry with the first print, coloring the print with coloring matter corresponding to said other negative, applying a second waterproof coating, applying a second transparent sensitized coating, printing thereon from the third of said negatives which is in registry with the first and second prints, and coloring the print with coloring matter corresponding to said third negative.

In testimony whereof I have signed my name to this specification in the presence of two subscribing witnesses.

MAX FRIEDRICH UNGERER.

Witnesses:
 JEAN GRUND,
 CARL GRUND.